(12) United States Patent
Smith

(10) Patent No.: US 8,031,732 B2
(45) Date of Patent: Oct. 4, 2011

(54) NETWORK INTERFACE AND ROUTER WITH A MASS STORAGE INTERFACE DEVICE EMULATING A HARD DISK CONTROLLER

(76) Inventor: Neale Bremner Smith, Alnwick (GB)

( * ) Notice: Subject to any disclaimer, the term of this patent is extended or adjusted under 35 U.S.C. 154(b) by 239 days.

(21) Appl. No.: 12/298,091

(22) PCT Filed: Apr. 25, 2007

(86) PCT No.: PCT/GB2007/001506
§ 371 (c)(1),
(2), (4) Date: Feb. 6, 2009

(87) PCT Pub. No.: WO2007/125313
PCT Pub. Date: Nov. 8, 2007

(65) Prior Publication Data
US 2009/0304011 A1    Dec. 10, 2009

(30) Foreign Application Priority Data

Apr. 25, 2006 (GB) .................................... 0608085.7

(51) Int. Cl.
*H04L 12/28* (2006.01)
*H04L 12/56* (2006.01)
*G06F 15/16* (2006.01)
*G06F 15/173* (2006.01)

(52) U.S. Cl. ......... 370/419; 709/202; 709/203; 709/238

(58) Field of Classification Search .................. 370/419; 709/202, 203, 238
See application file for complete search history.

(56) References Cited

U.S. PATENT DOCUMENTS

| | | | |
|---|---|---|---|
| 6,021,454 A | 2/2000 | Gibson | |
| 6,400,730 B1 | 6/2002 | Latif et al. | |
| 6,421,711 B1 | 7/2002 | Blumenau et al. | |
| 7,165,258 B1 | 1/2007 | Kuik et al. | |
| 7,197,047 B2 | 3/2007 | Latif et al. | |
| 2001/0055125 A1* | 12/2001 | Yamada et al. | 358/1.15 |
| 2002/0093980 A1* | 7/2002 | Trebes, Jr. | 370/466 |
| 2003/0140194 A1 | 7/2003 | Ishizaka | |

(Continued)

FOREIGN PATENT DOCUMENTS
WO   WO-02/054266   7/2002

(Continued)

OTHER PUBLICATIONS

Semeano et al. "IP Over SCSI Project Page", website URL: "http://ipoverscsi.sourceforge.net/index.html", Publication Date: Dec. 17, 2001.

(Continued)

*Primary Examiner* — Ronald Abelson
(74) *Attorney, Agent, or Firm* — John D. Lanza; Foley & Lardner LLP

(57) ABSTRACT

A network interface device (15a) has a mass storage device interface (3a), which emulates a hard disk controller to transfer network traffic between a node (Ia) and the network. As a result, the node (Ia), typically a computer, is presented with a virtual hard disk (4a), which network traffic (e.g. data) can be written to and read from using standard hard disk protocols, e.g. SATA or PATA. In a computer cluster (13), several network interface devices (15a-15c) may be integrated in a router (8) having a switch (9). The router may connect to optional components such as hard disks (17a, 17b), a processor (18) and a Ethernet connection (19).

58 Claims, 6 Drawing Sheets

U.S. PATENT DOCUMENTS

| | | | |
|---|---|---|---|
| 2004/0054840 A1* | 3/2004 | Berg et al. | 710/306 |
| 2004/0078467 A1 | 4/2004 | Grosner et al. | |
| 2005/0071472 A1 | 3/2005 | Arndt et al. | |
| 2005/0160044 A1* | 7/2005 | Hori et al. | 705/51 |
| 2006/0064405 A1 | 3/2006 | Jiang et al. | |
| 2007/0038434 A1* | 2/2007 | Cvetko | 703/23 |
| 2007/0061681 A1* | 3/2007 | Carmichael | 714/760 |
| 2007/0168481 A1* | 7/2007 | Lambert et al. | 709/223 |

FOREIGN PATENT DOCUMENTS

| | | |
|---|---|---|
| WO | WO-2004097571 | 11/2004 |

OTHER PUBLICATIONS

International Search Report on PCT/GB2007/001506, mailed on Nov. 5, 2007.

Written Opinion of the ISA for PCT/GB2007/001506, mailed on Nov. 5, 2007.

International Preliminary Report on Patentability for PCT/GB2007/001506, mailed on Oct. 28, 2008.

* cited by examiner

NETWORK INTERFACE AND ROUTER WITH A MASS STORAGE INTERFACE DEVICE EMULATING A HARD DISK CONTROLLER

The present invention relates to an apparatus and a method for connecting a communication network of nodes; and in particular, an apparatus and a method for establishing a network via a network interface device for use in High Performance Computing Clusters.

Computing clusters consist of a number of computers (nodes) which are connected over a network and run software to enable them to carry out processing in parallel. Execution of an application may be distributed over as many nodes as required. Processing is therefore accelerated and should result in complicated tasks being completed far more quickly and reliably than by a single node.

Various types of computing clusters are currently in use. High availability clusters provide redundant nodes which can carry out tasks on demand, i.e. when other nodes are occupied or otherwise unavailable to carry out the tasks. Load balancing clusters use load balancing techniques to distribute tasks between nodes in a cluster in order to optimise the use of available resources.

High Performance Computing (HPC) Clusters split computational tasks over a number of nodes which can process different parts of code simultaneously. An example of a HPC is the United States Department of Energy's BlueGene/L supercomputer, which comprises 65,536 nodes distributed amongst 64 cabinets.

Another HPC is Virginia Polytechnic Institute and State University's System X supercomputer, which comprises a computer cluster of 1100 2.3 GHz dual processor machines, each with 4 GB RAM, an 80 Gigabyte SATA hard disk and MacOS X operating system. This example illustrates the benefit of the concept of HPC systems in that cost-effective supercomputers can be constructed by networking a large number of off-the-shelf servers, at a fraction of the cost of mainframe supercomputers.

One area in which HPCs are especially effective is in situations where certain calculations, handled by one set of nodes, rely on the results of other calculations, handled by a different set of nodes. An alternative computer cluster type, known as a grid cluster, does not share results between nodes in this way but allocates distinct tasks to each node. The nodes are therefore independent and may operate on different platforms, architectures and operating systems. However, network connections are still required to receive instructions and to share resources (such as storage).

The effectiveness of a computing cluster is significantly dependent on the speed at which information can be transmitted between the nodes. Fast Ethernet, which is typically supported "out of the box" is limited to about 10 Megabytes/second. Gigabit Ethernet expands this capacity to about 100 Megabytes/second but may require additional hardware and software which can significantly increase the cost of HPC systems.

It is an object of at least one aspect of the present invention to provide an apparatus that obviates and mitigates one or more of the disadvantages and limitations of the prior art.

Moreover, it is an object of at least one aspect of the present invention to provide a high speed network interface using simplified hardware.

According to a first aspect of the present invention, there is provided a network interface device for connecting a node to a network, the network interface device comprising a mass storage device interface, the network interface device being operable to transfer network traffic between the node and the network via the mass storage device interface.

By providing a mass storage device interface, the network interface device will appear to the node as a mass storage device. In effect, the network interface device presents a virtual mass storage device to the node.

Preferably, the mass storage device interface is operable to transfer the network traffic with the node using a mass storage device protocol.

Preferably the mass storage device interface is operable to receive mass storage device commands from the node and the network interface device is operable to transfer the network traffic using the mass storage device commands.

As a result, the node may use standard mass storage interface protocols and commands to communicate with the network interface device, and ultimately the network, via the mass storage device interface.

Preferably, the network interface device is further operable to emulate a mass storage device.

Optionally, the emulation of the mass storage device comprises partial emulation of the mass storage device.

Preferably, the network interface device is further operable to emulate a mass storage device that appears to be local to the node.

By appearing to be a local mass storage device, the network interface device offers apparent distribution of storage while an overall system in which the network interface device is implemented may be centrally located.

Preferably, the network interface device is operable to emulate a hard disk controller.

Optionally, the emulation of the hard disk controller comprises partial emulation of the hard disk controller.

By emulating a hard disk controller, the network interface device may appear to the node to be a standard hard disk. Standard hard disk communication methods and protocols may therefore be used, simplifying integration.

Preferably, the network interface device is operable to emulate a hard disk controller selected from the group comprising ATA, SATA, PATA, eSATA, SCSI, ATAPI and SAS.

These controller protocols (ATA—Advanced Technology Attachment, SATA—Serial ATA, PATA—Parallel ATA, eSATA—external SATA, SCSI—Small Computer System Interface, ATAPI—ATA Packet Interface, and SAS—Serial Attached SCSI) are industry standard and further ensure cross-platform compatibility and will be supported, in most cases, "off the shelf".

Optionally, the network interface device is operable to emulate the hard disk controller of a boot disk.

A disc booting node may therefore be booted via the network interface device without the need for additional software.

Preferably, the mass storage device interface is operable to transfer the network traffic using a hard disk addressing scheme of the mass storage device protocol.

Preferably, the mass storage device interface is operable to receive one or more logical block addresses from the node and the network interface device is operable to transfer the network traffic using the one or more logical block addresses.

The logical block addresses (LBAs) can represent an address within the combined memory of all nodes. For example, a sector read/write may transfer 512 bytes of memory between a requesting node and the addressed node.

Alternatively, the mass storage device interface is operable to transfer the network traffic using a dedicated command of the mass storage device protocol in which the payload of the dedicated command comprises an address.

Preferably the network interface device further comprises communication means operable to transfer the network traffic between the network interface device and the network.

This provides a means for the network traffic to be transferred between the node and the network.

Preferably, the communication means is operable to transfer the network traffic between the network interface device and another network interface device in accordance with the first aspect.

In this way the network interface devices may form a router to transfer network traffic.

Optionally, the communication means is operable to transfer the network traffic between the network interface device and a switch.

Being able to transmit and receive network traffic to and from a second network interface device (sharing the same functionality) or a switch provides a link for transmitting information between the first node and another node or device connected to the switch.

According to a second aspect of the present invention, there is provided a router for providing network connections between a plurality of nodes, the router comprising a plurality of network interface devices of the first aspect.

The router provides a hardware component comprising a number of network interface devices which, in accordance with the first aspect, provide a means for the plurality of nodes to communicate with one another.

Preferably, the router further comprises a switch adapted to connect at least some of the plurality of network interface devices.

By routing between the network interface devices, network traffic can be transferred from one node to one or more other nodes connected to the router.

Optionally, the router further comprises a storage interface adapted to connect to a storage device.

This provides a means for transmitting and receiving network traffic to and from a storage device, for example a hard disk.

Optionally, the router further comprises a processor interface adapted to connect to a processing means.

This provides a means for transmitting and receiving network traffic to and from a processing means, such as a function accelerator or encryption, correlation or filtering means.

Optionally, the router further comprises an external network interface operable to connect the router to an external network.

Optionally, the router further comprises an external router interface operable to connect the router to one or more external routers.

Preferably, the one or more external routers comprises at least one router in accordance with the second aspect.

These provide means for transmitting and receiving network traffic to and from an external network, such as the Internet or local Ethernet, or to another router or routers for connecting to external clusters of nodes.

Optionally, the switch comprises the storage interface.

Optionally, the switch comprises the processor interface.

Optionally, the switch comprises the external network interface.

Incorporating these interfaces in the switch means that the switch can operably control network traffic transfer between any and all of the nodes and the storage device, processing means or external network.

Preferably, the switch is adapted to route network traffic using packet switching.

Packet switching permits store and forward mechanisms which improves performance under heavy loads.

Alternatively, the switch is adapted to route network traffic using circuit switching.

Circuit switching allows high speed and low latency transmission of network traffic.

Further alternatively, the switch is adapted to route network traffic using wormhole routing.

Wormhole routing reduces latency to levels comparable to circuit switching but retains the flexibility and store and forward nature of packet switching.

According to a third aspect of the present invention, there is provided a computer cluster comprising a plurality of nodes connected to a router of the second aspect to route network traffic between one or more of the plurality of nodes.

Optionally, the computer cluster further comprises at least one storage device operably connected to the router.

Optionally, the computer cluster further comprises at least one processing means operably connected to the router.

Optionally, the processing means comprises a function accelerator. Alternatively, the processing means is adapted to encrypt network traffic. Alternatively, the processing means is adapted to correlate network traffic. Alternatively, the processing means is adapted to filter network traffic.

The processing means can provide a means of performing a task on network traffic which would otherwise take up resources (i.e. nodes) in the cluster. For example, a vector processor could have the single task of computing fourier transforms on data in the network traffic, which could otherwise place unnecessary demand elsewhere.

Optionally, the computer cluster further comprises at least one network interface device operably connected to the router and adapted to provide a connection to an external network.

Optionally, at least one of the network interface devices is adapted to provide a connection to the Internet.

Alternatively, at least one of the network interface devices is adapted to provide a connection to a local area network.

The network interface device allows network traffic, which may be data or instructions, to be sent to or received from an external system.

According to a fourth aspect of the present invention, there is provided a method of transferring network traffic between a node and a network, the method comprising the step of transferring the network traffic between the node and the network using a mass storage device protocol.

Preferably, the step of transferring the network traffic between the node and the network uses a mass storage device protocol.

Preferably, the method further comprises the steps of receiving mass storage device commands from the node and transferring the network traffic using the mass storage device commands.

Preferably, the step of receiving mass storage device commands comprises receiving modified mass storage device commands.

Preferably, the step of transferring the network traffic using the mass storage device commands comprises using modified mass storage device commands.

Preferably, the step of transferring the network traffic comprises the step of emulating a mass storage device.

Optionally, the step of emulating the mass storage device comprises partial emulation of the mass storage device.

Preferably the step of transferring the network traffic comprises the step of emulating a mass storage device such that the mass storage device appears to be local to the node.

Preferably, the step of emulating a mass storage device comprises the step of emulating a hard disk controller.

Optionally, the step of emulating the hard disk controller comprises partial emulation of the hard disk controller.

Preferably, the step of emulating a hard disk controller comprises the step of emulating an ATA, SATA, PATA, eSATA, SCSI, ATAPI or SAS controller.

Optionally, the step of emulating a hard disk controller comprises the step of emulating the hard disk controller of a boot disk.

Preferably, the method further comprises the steps of receiving one or more logical block addresses from the node and transferring the network traffic using the one or more logical block addresses.

Optionally, the step of transferring the network traffic comprises the step of transferring network traffic with a switch.

According to a fifth aspect of the present invention, there is provided a method of routing network traffic between a plurality of nodes, the method comprising the step of transferring the network traffic between the plurality of nodes using a mass storage device protocol.

Preferably, the step of transferring the network traffic further comprises the step of emulating a plurality of mass storage devices.

Optionally, the step of emulating the plurality of mass storage devices comprises partial emulation of the plurality of mass storage devices.

Preferably, the step of transferring the network traffic further comprises the step of switching the network traffic.

Optionally, the step of transferring the network traffic further comprises the step of routing the network traffic to a storage device.

Optionally, the step of transferring the network traffic further comprises the step of routing the network traffic to a processing means.

Optionally, the step of transferring the network traffic further comprises the step of routing the network traffic to an external network.

Optionally, the step of transferring the network traffic further comprises the step of routing the network traffic to another plurality of nodes.

Preferably, the step of switching comprises the step of packet switching.

Alternatively, the step of switching comprises the step of circuit switching.

Further alternatively, the step of switching comprises the step of wormhole routing.

The present invention will now be described by way of example only and with reference to the accompanying figures in which.

Figure 1:
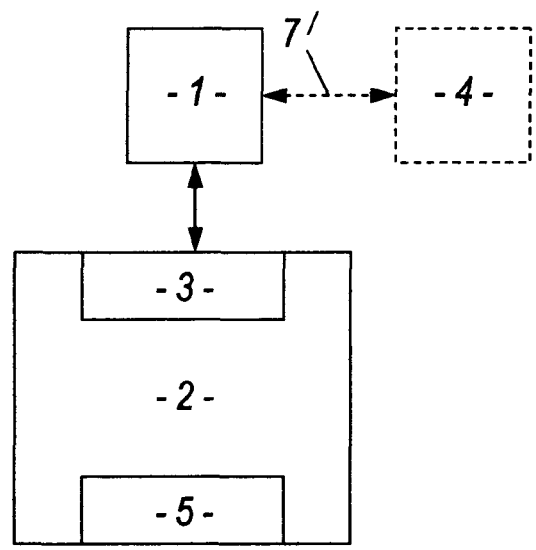
FIG. 1 illustrates in schematic form a node connected to a network interface device in accordance with an aspect of the present invention.

FIG. 1 shows a node 1, which may be a PC or other kind of computer, connected to a network interface device 2 by a hard disc cable 7. The network interface device 2 comprises an interface 3 which emulates a hard disk controller. As a result, the node 1 is presented with a virtual hard disk 4, which network traffic (e.g. data) can be written to and read from using standard hard disk protocols (e.g. SATA or PATA). The network interface device 2 also comprises a communication means 5 which provides a way for the network interface device 2 to connect to the network, for example to other network interface devices (as discussed with reference to FIG. 2 below) or to a switch (as discussed with reference to FIG. 3 below). Regardless of what connection is established at the connection means, the network interface device 2, or more accurately the interface 3, may appear as a hard disk 4 to the node 1.

This emulation includes partial emulation of the storage device or controller, such as responding to a basic subset of the commands in the style of a hard disk controller (e.g. "Identify Device") even though other storage commands are not emulated.

The SATA implementation may use Native Command Queuing, which is a mechanism within the SATA protocol, comparable to the "legacy" ATA queuing mechanism, but more efficient.

First-party DMA transfer may also be supported by the hard disk interface for network traffic. This is a mechanism within the SATA protocol to allow devices to initiate a DMA read or write of the host's memory. This removes the delays imposed by polling or interrupts and the overheads of the host device driver sending read/write commands at the time. The host informs the device of which memory it can read or write in advance of the device needing to access it, so once the transfer is required the device has all of the information and permissions required.

The LBA used for memory addressing does not need to have the same block size as that used for storage. For example, when using the router as a storage device the LBA might have bit 47=0 and the bottom 47 bits represent the address of 512-byte sectors; when using the router as a network the LBA might have bit 47=1 and the bottom 47 bits represent the address of 4-byte words, giving a total addressable space of $(2^{47})*4=512$ Tbytes of memory in the whole cluster.

It is envisaged that the node 1 may comprise a host controller, adapted to communicate with a device controller of the interface 3. This is analogous to the simple connection of a node to a hard disk.

Figure 2:
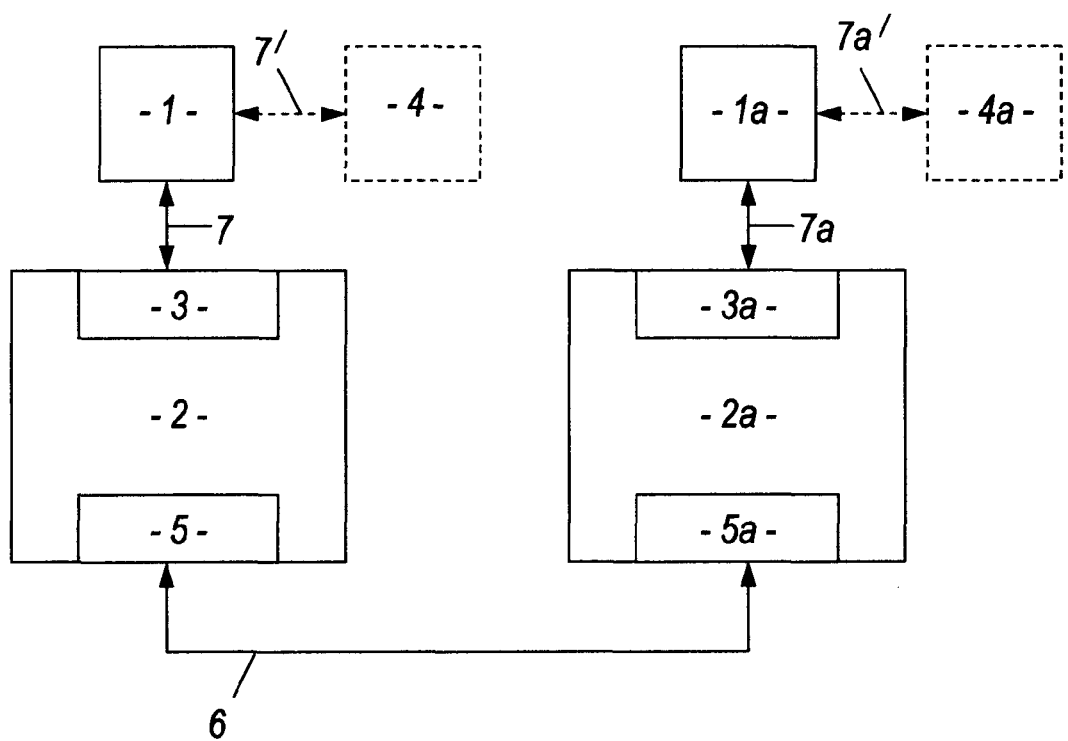
FIG. 2 illustrates in schematic form two nodes connected to one another via corresponding network interface devices in accordance with an aspect of the present invention.

FIG. 2 illustrates two nodes 1, 1a which are connected to one another via corresponding network interface devices 2, 2a. The communication means 5 of the first network interface device 2 is connected, optionally via a hard disk cable 6, to the communication means 5a of the second network interface device 2a. Alternatively, any kind of suitable connection may be used in place of the hard disc cable 6, for example a switch as discussed with reference to FIG. 3 below.

Again, the connection 6 between the two nodes 1, 1a appears as a virtual hard disk connection 7', 7a' to each node, and thus hard disk commands and protocols can be implemented to transfer data between the nodes 1, 1a. Hard disk interfaces are generally much faster than conventional network connections and so the present invention provides a way of transferring data between the nodes that is quicker than conventional networks allow.

Figure 3:
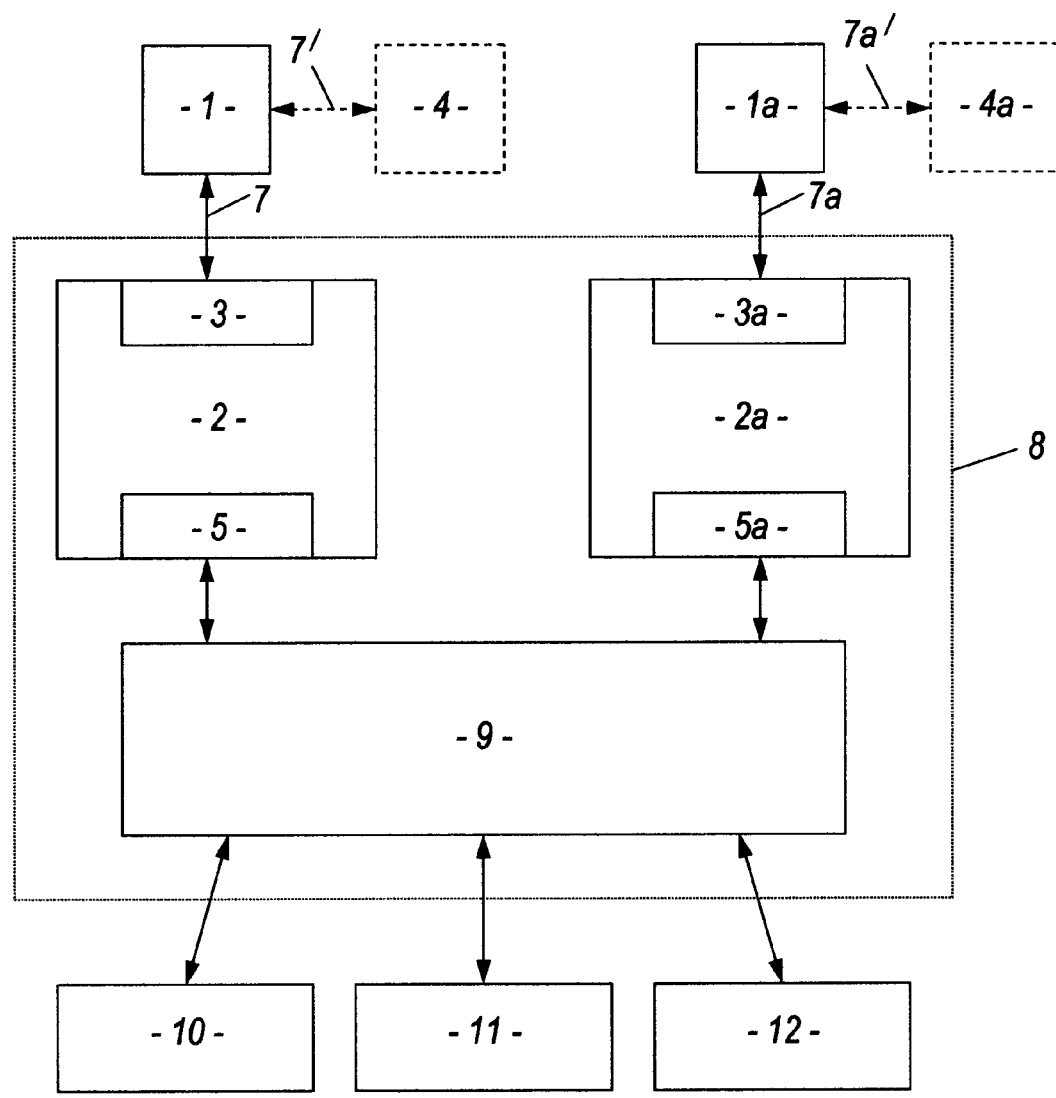
FIG. 3 illustrates in schematic form two nodes connected to one another and to proprietary devices via a router in accordance with an aspect of the present invention.

FIG. 3 illustrates two nodes 1, 1a connected to a router 8, in which the router 8 incorporates the two network interface devices 2, 2a illustrated in FIG. 2. Furthermore, the router 8 incorporates a switch 9, which performs the routing of data between the nodes 1, 1a, via the network interface devices 2, 2a. In this example, a storage device 10, a processing means 11 and a network interface device 12 are also connected to the switch 9. The switch 9 may use various ways to route data between the nodes, for example packet switching, circuit switching or wormhole routing, using configurations such as a crossbar switch, butterfly network and ring network.

The system of FIG. 3 can be readily expanded to support many more nodes.

Figure 4:
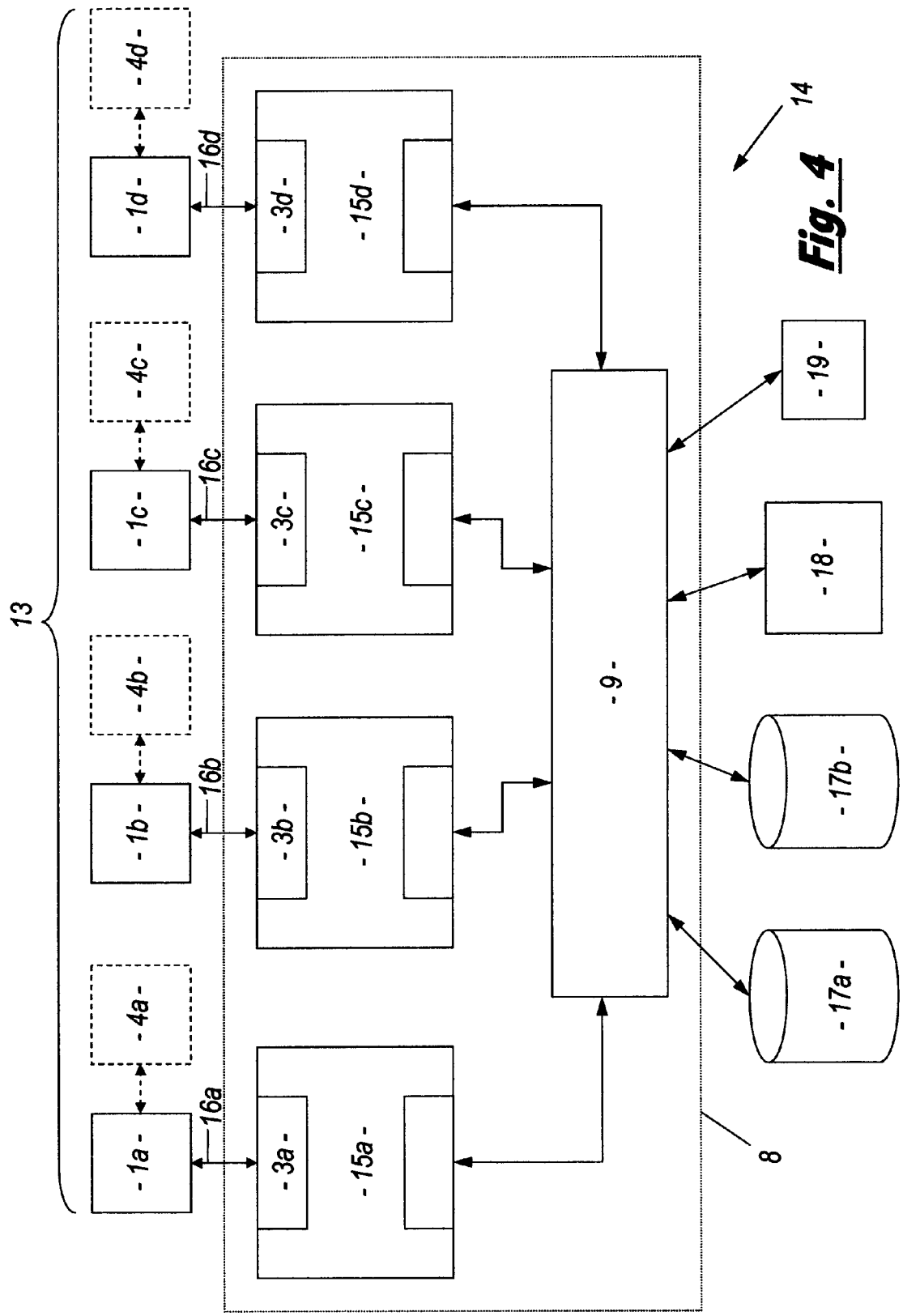
FIG. 4 illustrates in schematic form a computing cluster arranged in accordance with an aspect of the present invention.

With reference to FIG. 4, there is presented an exemplary embodiment of a computing cluster 13 arranged in accordance with the present invention, as described in detail below. The computing cluster comprises a cluster of four nodes 1a,1b,1c,1d, a router 8, and a number of optional components 14. The cluster 13 of nodes may be a computer cluster, such as a High Performance Computing (HPC) Cluster. HPCs, for example, may share a computational load across a number of nodes (computers) which act in parallel as effectively one unit. An alternative embodiment makes use of the grid computing model in which process execution is distributed across a parallel infrastructure such as that provided by a number of nodes connected over a network.

In this embodiment, each node 1a,1b,1c,1d is connected to the router 8 which provides a link between the nodes 1a,1b, 1c,1d. The router 8 comprises a number of network interface devices 15a,15b,15c,15d, generally at least one for each of the n nodes, each having an interface 3a,3b,3c,3d which allow the nodes 1a,1b,1c,1d to connect to the router 8. The network interface devices 15a,15b,15c,15d in this embodiment are simple hard disk controllers and provide only flow control functionality to the system. However, it is envisaged that the SATA ports may be adapted to carry out more complex operations such as buffering and filtering.

The network interface devices 15a,15b,15c,15d may provide a physical layer link, in accordance with the OSI seven layer model, between the nodes and the router.

Although the network interface devices have been described in generic terms, in this embodiment they may be SATA ports, but the use of other hard disk controller protocols is also envisaged. Examples include PATA, IDE, ATAPI, SCSI and External SATA (eSATA). In any case, the essence of the invention remains; that each network connection 16a,16b, 16c,16d—or interface device—is provided by a mass storage device interface. The benefit achieved by this is that a network interface device (such as the SATA port) appears to each node 1a,1b,1c,1d as a storage device 4a,4b,4c,4d, and can thus make use of standard storage interfaces and associated protocols. For example, such a network interface device may appear to be a standard hard disk as far as a particular node is concerned. This has the advantage that no additional software protocols need be implemented, and in fact may offer "plug and play" functionality.

Furthermore, as discussed in relation to the previous figures, the network interface device 15a,15b,15c,15d may appear to be a standard hard disk, and so the disk will appear as local (e.g. internal) to each of the nodes 1a,1b,1c,1d, even though the actual interface devices 15a,15b,15c,15d provide links to a networked node or nodes.

If, for example, the network interface device 15a,15b,15c, 15d is selected as a startup or "boot" device, a node 1a,1b,1c, 1d may be "netbooted" i.e. booted over the network—without the need for any additional software. Most PCs are able to boot from a hard disk and to the PC itself there would be no discernable difference.

The resources available to the cluster 13 may be aggregated and addressed using a single addressing scheme. By way of example, the collective storage capacity of the nodes 1a,1b, 1c,1d and any connected storage devices 17a,17b may be considered as one large virtual hard disc. This virtual hard disc is presented to each of the nodes 1a,1b,1c,1d by the network interface devices 15a,15b,15c,15d. A single address, for example a 512 byte Logical Block Address (LBA), may therefore be used in relation to a read/write command from a particular node 1a,1b,1c,1d, and the command executed on whatever node 1a,1b,1c,1d, or storage device 17a,17b, the virtual address corresponds to in the real system. This LBA is the address of 512-byte-sized blocks, but is not itself 512 bytes in size. Other sizes may be used. SATA, for example uses 48-bit LBAs, giving $(2^{48})*512=144\times10^{15}$ bytes of "storage".

Furthermore, in this way it is envisaged that a memory-bound data structure on a particular node 1a,1b,1c,1d could be represented as a file which other nodes 1a,1b,1c,1d can access.

The optional components in this example include two hard disks 17a,17b, a processing means 18 and a connection 19 to a local Ethernet. The hard disks 17a,17b provide additional storage which can form part of the aggregated memory discussed above, or provide swap file storage for the processing means 18. The processing means 18 is separate from the nodes 1a,1b,1c,1d and performs repetitive calculations which may typically be inefficient to run on the nodes 1a,1b,1c,1d due to the need for specialised software or hardware logic functions.

A connection 19 to an external network, in this case a local Ethernet, allows the cluster 13 to integrate with other systems. For example, a number of clusters could have interface devices to increase processing capability. Alternatively, it would allow the cluster 13 to receive instructions from an external source, including over the Internet.

Figure 5A:
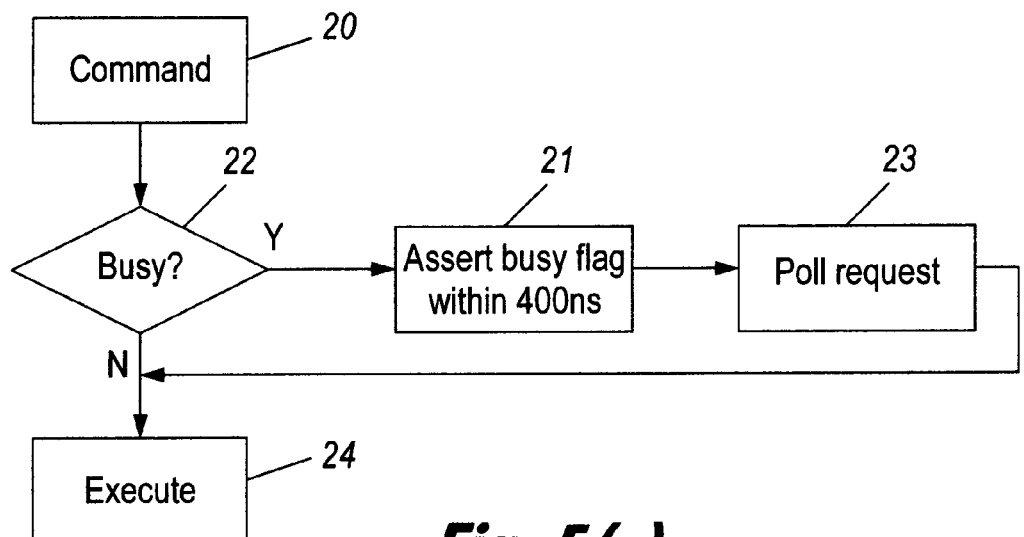
FIG. 5 illustrates in schematic form the issuance of a command using the ATA protocol in accordance with (a) the prior art and (b) the present invention.
Figure 5B:
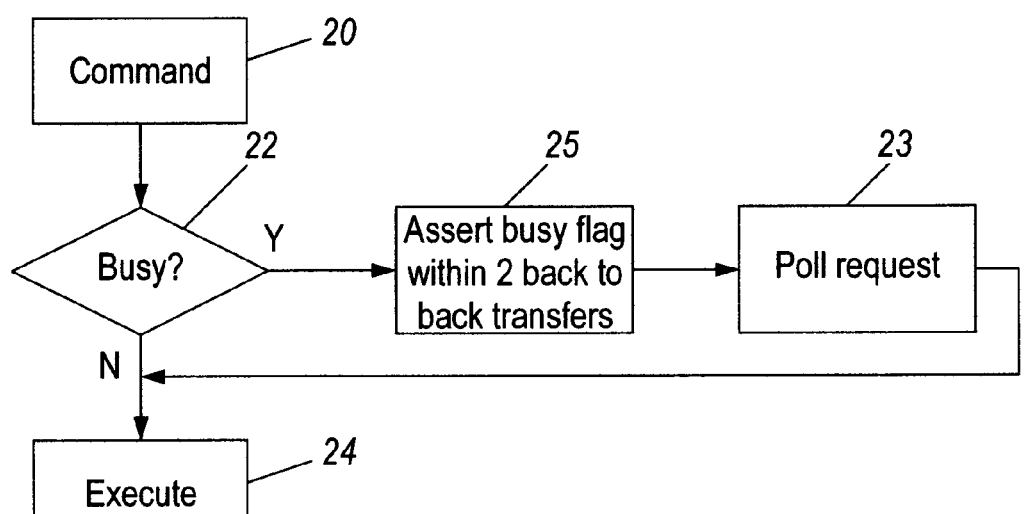

With reference to FIGS. 5(a) and 5(b), there is illustrated a summary of aspects of the protocol proposed. FIG. 5(a) is the prior art ATA protocol, in which a command is issued 20, and a busy flag is asserted 21 within 400 ns to indicate that the ATA device is busy 22. The command is therefore polled 23 to avoid communication with the ATA device when it is not listening. When available the command is executed 24.

The speed of modern CPUs is such that 400 ns is a comparatively long time to wait. This may require a deliberate wait. FIG. 5(b) illustrates how the present invention may overcome this by asserting the busy flag within the time for two back to back data transfers 25 over the ATA interface, removing the need for the delay. The switch illustrated in FIG. 4 may be adapted such that no busy flag need be asserted at all, by adopting a high-availability node configuration. Although this embodiment describes using the ATA protocol, alternative methods available through the SATA protocol may be among those used.

Figure 6:
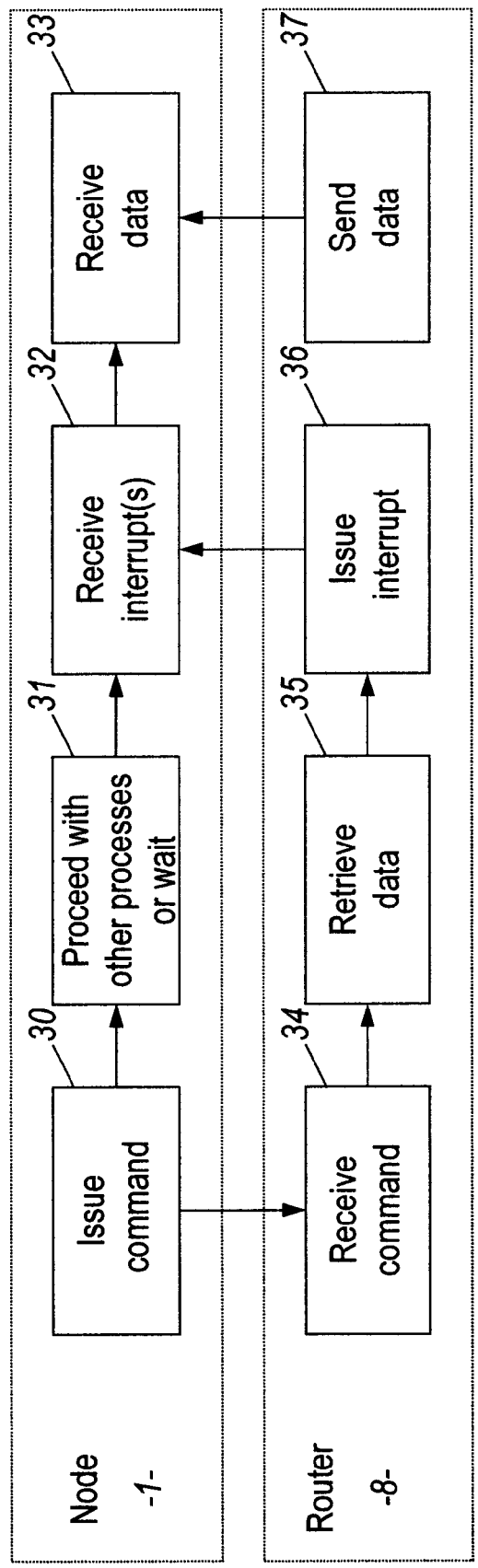
FIG. 6 illustrates in schematic form the handling of a request for data from a node connected to a router in accordance with the present invention.

FIG. 6 illustrates how a request from a node 1 to read data is handled. The node issues a read command 30 to the router 8. As the connection is via a hard disk controller this command will be a standard ATA read command, specifying appropriate LBA registers. Once the command is issued, the node continues with other processes 31 while waiting to receive an interrupt 32 from the router. The router receives the command 34, and retrieves the data 35 from the appropriate location (as per the LBA registers). Once the data has been retrieved, an interrupt is issued 36 and sent to the node. When the node receives the interrupt 32 it prepares to receive the data 33 and the router sends the data 37 to the node.

Figure 7:
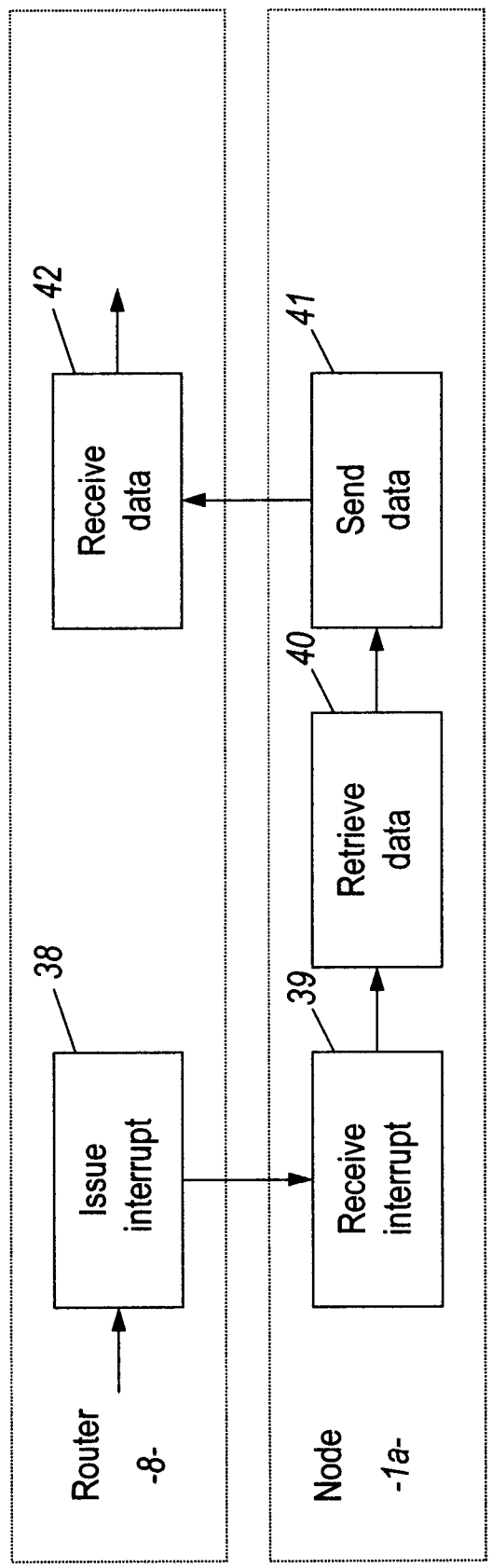
FIG. 7 illustrates in schematic form the detail of the step of retrieving requested data from another node in accordance with the present invention.

FIG. 7 shows detail of the step of retrieving the data 35 in FIG. 6 from another node 1a. The router 8 issues an interrupt 38 to node 1a, node 1a receives the request 39 from the router, retrieves the data 40 and sends the requested data 41 to the router, which receives the data 42.

To write data from the node an analogous method is used. The write command is issued, specifying appropriate LBA registers and a "write synchronous" command provided which returns an interrupt after the data has been written.

The read/write request may be processed by the interrupt handler itself, or by an external process started by the interrupt handler.

The data received by the node may be written into the node's memory at an address specified by the LBA registers. In the case of a read command, it may be a request to read data from the node's memory at an address specified by the LBA registers. Alternatively, the data may be a request to initiate a process at the destination. This may therefore form the basis of a remote procedure call (RPC) system, in which nodes in a cluster can initiate processes on other nodes. Similarly, it can form the basis of a client/server arrangement, a process fork being executed over multiple nodes, process migration over nodes, or a load-balancing system.

It is envisaged that an optional TCP/IP mass-storage protocol conversion layer be implemented to allow standard TCP/IP protocols to be used seamlessly over the interface devices, similarly to Ethernet.

It is also envisaged that direct transfer between nodes can occur without buffering or caching so that the transfer is direct to the remote node. Alternatively, if the node is being written to as part of an aggregated virtual hard disk, buffering and caching may be used. In this case, locking may also be implemented to prevent conflicts between read/write commands from different nodes.

Advantageously, any modifications to the protocols discussed herein should be implemented directly, i.e. at the lowest software level. Modifying the protocol at or near the hardware layer will provide greater performance than modifications to the filesystem or cache/buffer code.

A number of advantages can be had over the state of the art with regard to a number of features of the network interface device and associated apparatus and methods. In the first instance, mass storage device interfaces such as PATA and SATA (and their variants) offer much higher data transfer rates than current standard networking protocols enabling HPCs, by way of example, to operate with increased speed.

It also further enables computing clusters to be established using "off the shelf" PCs without the need to incorporate high speed networking capabilities in each one.

In summary, the present invention will allow a network of nodes to be established with relative ease, reduced cost and improved speed and efficiency.

Further modifications and improvements may be added without departing from the scope of the invention described by the claims. For example, where nodes have been considered as PCs, they may in fact be any kind of computer capable of connecting to a mass storage device interface. This includes not only Windows PCs, but machines running MacOS and Linux, and any other suitable operating system.

What is claimed is:

1. A network interface device for connecting a node to a network, the network interface device comprising a mass storage device interface, the network interface device emulating a mass storage device and appearing to the node as a local mass storage device, the network interface device operable to transfer network traffic between the node and the network via the mass storage device interface.

2. The network interface device of claim 1 wherein the mass storage device interface is operable to transfer the network traffic with the node using a mass storage device protocol.

3. The network interface device of claim 1 wherein the mass storage device interface is operable to receive mass storage device commands from the node and the network interface device is operable to transfer the network traffic using the mass storage device commands.

4. The network interface device of claim 1 wherein the emulation of the mass storage device comprises partial emulation of the mass storage device.

5. The network interface device of claim 1 wherein the network interface device is operable to emulate a hard disk controller.

6. The network interface device of claim 5 wherein the emulation of the hard disk controller comprises partial emulation of the hard disk controller.

7. The network interface device of claim 5 wherein the hard disk controller is selected from the group comprising Advanced Technology Attachment (ATA), Serial ATA (SATA), Parallel ATA, external SATA, Small Computer System Interface (SCSI), ATA Packet Interface, and Serial Attached SCSI.

8. The network interface device of claim 5 wherein the network interface device is operable to emulate the hard disk controller of a boot disk.

9. The network interface device of claim 2 wherein the mass storage device interface is operable to transfer the network traffic using a hard disk addressing scheme of the mass storage device protocol.

10. The network interface device of claim 1 wherein the mass storage device interface is operable to receive one or more logical block addresses from the node and the network interface device is operable to transfer the network traffic using the one or more logical block addresses.

11. The network interface device of claim 1 wherein the mass storage device interface is operable to transfer the network traffic using a dedicated command of the mass storage device protocol in which the payload of the dedicated command comprises an address.

12. The network interface device of any previous claim wherein the network interface device further comprises communication means operable to transfer the network traffic between the network interface device and the network.

13. The network interface device of claim 12 wherein the communication means is operable to transfer the network traffic between the network interface device and another network interface device.

14. The network interface device of claim 12 wherein the communication means is operable to transfer the network traffic between the network interface device and a switch.

15. A router for providing network connections between a plurality of nodes, the router comprising a plurality of network interface devices of according to claim 1.

16. The router of claim 15 further comprising a switch adapted to connect at least some of the plurality of network interface devices.

17. The router of claim 15 further comprising a storage interface adapted to connect to a storage device.

18. The router of claim 15 further comprising a processor interface adapted to connect to a processing means.

19. The router of claim 15 further comprising an external network interface operable to connect the router to an external network.

20. The router of claim 15 further comprising an external router interface operable to connect the router to one or more external routers.

21. The router of claim 17 wherein the switch comprises the storage interface.

22. The router of claim 18 wherein the switch comprises the processor interface.

23. The router of claim 19 wherein the switch comprises the external network interface.

24. The router of claim 16 wherein the switch is adapted to route network traffic using packet switching.

25. The router of claim 16 wherein the switch is adapted to route network traffic using circuit switching.

26. The router of claim 16 wherein the switch is adapted to route network traffic using wormhole routing.

27. A computer cluster comprising a plurality of nodes connected to a router of claim 15 to route network traffic between one or more of the plurality of nodes.

28. The computer cluster of claim 27 further comprising at least one storage device operably connected to the router.

29. The computer cluster of claim 27 further comprising at least one processing means operably connected to the router.

30. The computer cluster of claim 29 wherein the processing means comprises a function accelerator.

31. The computer cluster of claim 29 wherein the processing means is adapted to encrypt network traffic.

32. The computer cluster of claim 29 wherein the processing means is adapted to correlate network traffic.

33. The computer cluster of claim 29 wherein the processing means is adapted to filter network traffic.

34. The computer cluster of claim 27 further comprising at least one external network interface device operably connected to the router and adapted to provide a connection to an external network.

35. The computer cluster of claim 34 wherein at least one of the external network interface devices is adapted to provide a connection to the Internet.

36. The computer cluster of claim 34 wherein at least one of the external network interface devices is adapted to provide a connection to a local area network.

37. A method of transferring network traffic between a node and a network, the method comprising the steps of:
providing a network interface device comprising a mass storage device interface, the network interface device appearing to the node as a mass storage device;
emulating a mass storage device such that the mass storage device appears to be local to the node; and
transferring the network traffic between the node and the network using a mass storage device protocol.

38. The method of claim 37 wherein the step of transferring the network traffic between the node and the network uses a mass storage device protocol.

39. The method of claim 37 further comprising the steps of receiving mass storage device commands from the node and transferring the network traffic using the mass storage device commands.

40. The method of claim 39 wherein the step of receiving mass storage device commands comprises receiving modified mass storage device commands.

41. The method of claim 39 the step of transferring the network traffic using the mass storage device commands comprises using modified mass storage device commands.

42. The method of claim 37 wherein the step of emulating the mass storage device comprises partial emulation of the mass storage device.

43. The method of claim 37 wherein the step of emulating a mass storage device comprises the step of emulating a hard disk controller.

44. The method of claim 43 wherein the step of emulating the hard disk controller comprises partial emulation of the hard disk controller.

45. The method of claim 43 wherein the step of emulating a hard disk controller comprises the step of emulating a hard disk controller selected from the group comprising Advanced Technology Attachment (ATA), Serial ATA (SATA), Parallel ATA, external SATA, Small Computer System Interface (SCSI), ATA Packet Interface, and Serial Attached SCSI.

46. The method of claim 43 wherein the step of emulating a hard disk controller comprises the step of emulating the hard disk controller of a boot disk.

47. The method of claim 37 further comprising the steps of receiving one or more logical block addresses from the node and transferring the network traffic using the one or more logical block addresses.

48. The method of claim 37 wherein the step of transferring the network traffic comprises the step of transferring network traffic with a switch.

49. A method of routing network traffic between a plurality of nodes, the method comprising the steps of:
providing a network interface device comprising a mass storage device interface, the network interface device appearing to the node as a mass storage device;
emulating a plurality of mass storage devices; and
transferring the network traffic between the plurality of nodes using a mass storage device protocol.

50. The method of claim 49 wherein the step of emulating the plurality of mass storage devices comprises partial emulation of the plurality of mass storage devices.

51. The method of claim 49 wherein the step of transferring the network traffic further comprises the step of switching the network traffic.

52. The method of claim 49 wherein the step of transferring the network traffic further comprises the step of routing the network traffic to a storage device.

53. The method of claim 49 wherein the step of transferring the network traffic further comprises the step of routing the network traffic to a processing means.

54. The method claim 49 wherein the step of transferring the network traffic further comprises the step of routing the network traffic to an external network.

55. The method of claim 49 wherein the step of transferring the network traffic further comprises the step of routing the network traffic to another plurality of nodes.

56. The method of claim 51 wherein the step of switching comprises the step of packet switching.

57. The method of claim 51 wherein the step of switching comprises the step of circuit switching.

58. The method of claim 51 wherein the step of switching comprises the step of wormhole routing.

* * * * *